United States Patent [19]

Ogawa et al.

[11] Patent Number: 4,551,756
[45] Date of Patent: Nov. 5, 1985

[54] INTERCARRIER SOUND DETECTING APPARATUS FOR A TELEVISION RECEIVER

[75] Inventors: Masumi Ogawa; Hiromi Kawakami, both of Yokohama; Toshiaki Meguro, Akishima, all of Japan

[73] Assignee: Sony Corporation, Tokyo, Japan

[21] Appl. No.: 445,464

[22] Filed: Nov. 30, 1982

[30] Foreign Application Priority Data

Dec. 16, 1981 [JP] Japan ................................ 56-203139

[51] Int. Cl.[4] .......................... H04N 5/62; H04N 5/60
[52] U.S. Cl. ..................................... 358/197; 358/198; 375/81
[58] Field of Search ...................... 358/143, 144, 195.1, 358/196, 197, 198; 329/50; 455/173, 182; 375/81, 120

[56] References Cited

U.S. PATENT DOCUMENTS

| 4,365,205 | 12/1982 | Dehaene | 375/81 |
| 4,392,254 | 7/1983 | Ecklund | 455/173 |
| 4,490,743 | 12/1984 | Mycynek et al. | 358/197 |

FOREIGN PATENT DOCUMENTS 58-19084 2/1983 Japan ................................... 358/198

Primary Examiner—Tommy P. Chin
Assistant Examiner—Michael D. Parker
Attorney, Agent, or Firm—Lewis H. Eslinger; Alvin Sinderbrand

[57] ABSTRACT

An intercarrier sound detecting apparatus for a television receiver includes an antenna for receiving a television signal; a tuner for selecting a desired frequency range of the received television signal from the antenna and producing a tuned signal having a video intermediate frequency component in response thereto; a filter for extracting the video intermediate frequency component from the tuned signal; video intermediate frequency amplifiers for producing a video intermediate frequency signal having an amplitude-modulated video carrier component, in response to the extracted video intermediate frequency component; a phase-locked loop which phase-locks the video intermediate frequency signal with respect to the amplitude-modulated video carrier component thereof and produces an output signal having a 4.5 MHz beat signal component in response thereto; a band pass filter for transmitting substantially only the 4.5 MHz beat signal component; and a frequency discriminator for producing a sound signal in response to the 4.5 MHz beat signal component transmitted through the band pass filter.

8 Claims, 2 Drawing Figures

INTERCARRIER SOUND DETECTING APPARATUS FOR A TELEVISION RECEIVER

BACKGROUND OF THE INVENTION

1. Field of the Invention

This invention relates generally to sound systems for use with television receivers and, more particularly, is directed to sound detecting apparatus of the intercarrier type for use with television receivers.

2. Description of the Prior Art

Various types of sound detecting apparatus for use with television receivers are well known in the art. For example, in a split-carrier sound detecting apparatus, the video signal and sound signal are independently processed. However, with such apparatus, distortion of the sound output as a result of fluctuation of the local oscillation frequency may result. Further, with such apparatus, radiation jamming from the power source and deflection system may result. Further, because of the complicated circuit construction with a split-carrier sound detecting apparatus, the cost thereof is greatly increased over other sound detecting apparatus which utilize relatively simple circuit constructions. Accordingly, it is generally desirable to utilize other sound detecting apparatus, for example, an intercarrier sound detecting apparatus, in order to enjoy good sound in response to a sound-multiplexed broadcast.

Intercarrier sound detecting apparatus for use with television receivers are also well known in the art. In one known intercarrier sound detecting apparatus, the television broadcast signal is received by an antenna and passes through a tuner, a filter for extracting a video intermediate frequency (VIF) signal, and a plurality, for example, three VIF amplifier stages. The output signal from the last VIF amplifier stage is supplied to a diode envelope detector circuit which provides a beat signal having a frequency of 4.5 MHz and which is based upon the sound carrier component having a frequency of 54.25 MHz and the video carrier component having a frequency of 58.75 MHz. The beat signal from the 4.5 MHz diode envelope detector circuit is then supplied to a band pass filter which passes only the 4.5 MHz signal to a sound IF amplifier, an amplitude limiter and a frequency discriminator which produces the sound signal at an output thereof. In other words, with the aforementioned intercarrier sound detecting apparatus, the 4.5 MHz beat or difference signal is provided in response to the video carrier and sound carrier components and is then frequency-discriminated.

However, with the aforementioned circuit, because the 4.5 MHz beat signal is produced in response to the video carrier and sound carrier components, a buzz and a buzz beat is caused by the amplitude component of the video carrier component. Thus, in response to a sound-multiplexed broadcast, the intercarrier sound detecting apparatus described above generates an undesirable buzz and a buzz beat in a sound sub-channel.

OBJECTS AND SUMMARY OF THE INVENTION

Accordingly, it is an object of the present invention to provide sound detecting apparatus of the intercarrier type for use with television receivers that avoids the above-described difficulties encountered with the prior art.

More particularly, it is an object of this invention to provide sound detecting apparatus of the intercarrier type for use with television receivers that substantially reduces any buzz and buzz beat caused by the amplitude component of the video carrier signal.

In accordance with an aspect of this invention, sound detecting apparatus for a television receiver includes means for receiving a television signal; video intermediate frequency means for producing a video intermediate frequency signal having an amplitude-modulated video carrier component, in response to the received television signal; phase-locked loop means for phase-locking the video intermediate frequency signal with respect to the amplitude-modulated video carrier component and producing an output signal in response thereto; and sound signal generating means for producing a sound signal in response to the output signal.

The above, and other, object, features and advantages of the invention will become apparent from the following detailed description of an illustrative embodiment thereof which is to be read in connection with the accompanying drawings.

DETAILED DESCRIPTION OF A PREFERRED EMBODIMENT

Figure 1:
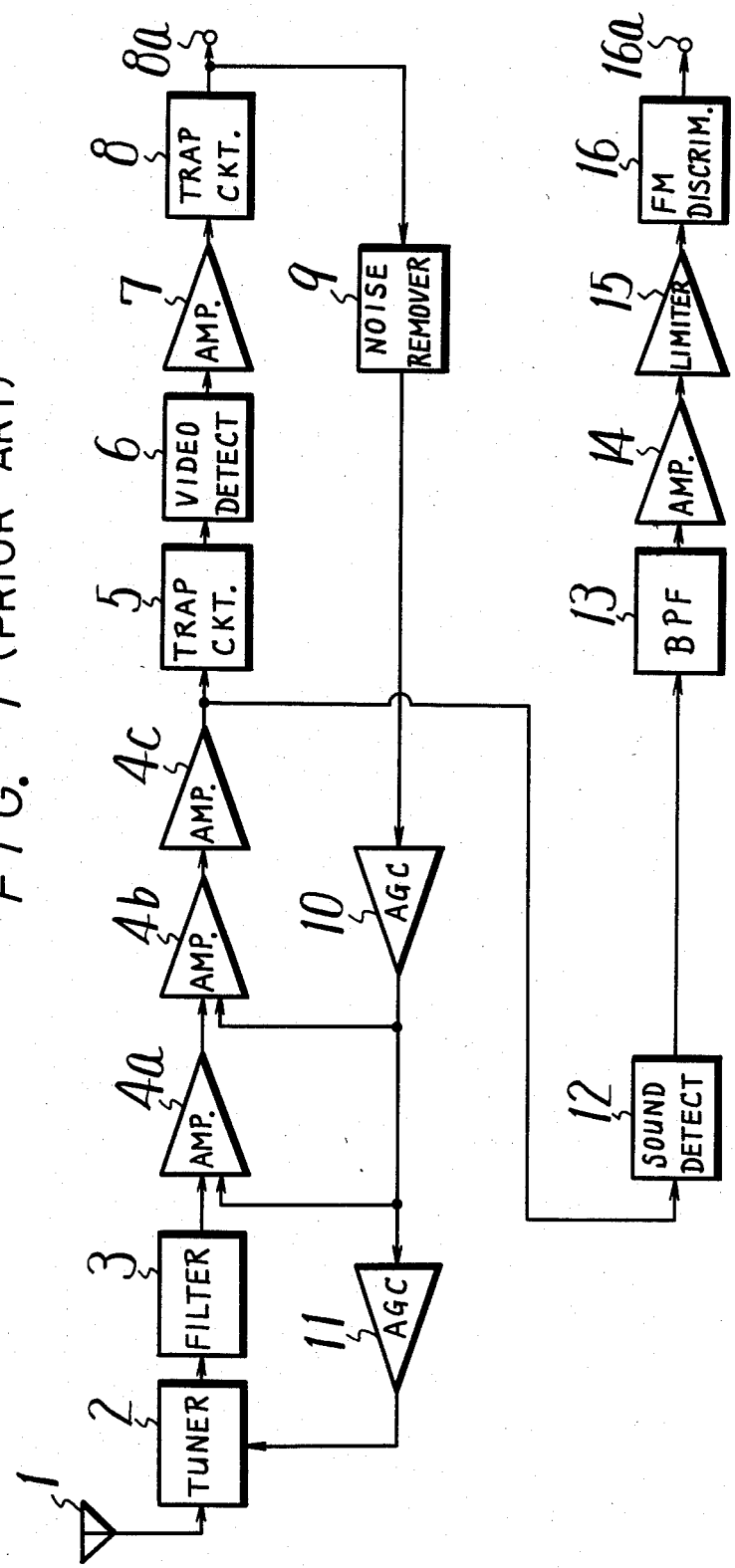
FIG. 1 is a block diagram of a prior art sound detecting circuit for use with a television receiver.

Referring to the drawings in detail, and initially to FIG. 1 thereof, in an intercarrier sound detecting circuit according to the prior art, a television broadcast signal is supplied to a tuner 2 thereof from an antenna 1. Tuner 2 selects a certain frequency range of the television broadcast signal corresponding to a desired channel and amplifies the same. A filter 3 extracts the video intermediate frequency (VIF) signal from the output of turner 2 and supplies the VIF signal through series-connected first, second and third VIF amplifier circuits 4a, 4b and 4c, respectively, to a trap circuit 5 which traps and thereby substantially reduces the sound carrier component having a frequency $f_S$ of, for example, 54.25 MHz, from the VIF signal. The output signal from trap circuit 5 is supplied to a video detector 6 which generally translates instantaneous variations in the peak amplitudes of the VIF signal into a unidirectional voltage of either positive or negative polarity. At the output of video detector 6, the picture information, blanking and synchronizing voltages have been separated from the VIF carrier, and a 4.5 MHz signal is also present. The output signal from video detector 6 is then supplied to a video amplifier 7 which amplifies the video output voltage from video detector 6 to a sufficiently high level for driving the cathode ray tube (CRT) directly. Video amplifier 7 also functions to deliver the video voltage with a correct phase to the control grid of the CRT. A trap circuit 8 is connected to the output of video amplifier 7 for trapping or eliminating the 4.5 MHz signal and, in turn, supplies a video output signal through an output terminal 8a to the CRT (not shown).

In addition, the video output signal from trap circuit 8 is supplied through a noise removing circuit 9 to a VIF automatic gain control (AGC) circuit 10 which supplies a control signal to VIF amplifiers 4a and 4b for controlling the gain thereof. In addition, the control signal from VIF AGC circuit 10 is supplied to a tuner automatic gain control (AGC) circuit 11 which, in turn, supplies a tuner control signal to a high frequency amplifier of tuner 2 to control the gain thereof.

In regard to the intercarrier sound detecting circuit in FIG. 1, the VIF signal from third VIF amplifier 4c is supplied to a diode envelope detector circuit 12 which provides a beat or difference signal having a frequency $f_{p\text{-}fs}$ of 4.5 MHz, in response to the sound carrier component of the VIF signal which has a frequency $f_S$ of 54.25 MHz and the video carrier component of the VIF signal which has a frequency $f_p$ of 58.75 MHz. It is to be appreciated that the sound carrier component and video carrier component are thereby mixed or heterodyned in sound detector 12 such that 58.75 MHz−54.25 MHz=4.5 MHz. The output signal from detector 12 and having a frequency of $f_p - f_S$ is then supplied to a band pass filter (BPF) 13 which transmits therethrough only that portion of the output signal from detector circuit 12 having a frequency of 4.5 MHz and supplies the same to a sound IF amplifier 14 and then to an amplitude limiter 15. The output signal from amplitude limiter 15 is then supplied to a frequency discriminator circuit 16 in which the 4.5 MHz difference or beat signal is frequency-discriminated to produce the output sound or audio signal at an output terminal 16a.

It is to be appreciated that the sound signal can be easily obtained from a television broadcast signal with the relatively simple circuit of FIG. 1. However, with the circuit of FIG. 1, in which the 4.5 MHz difference or beat sound signal is produced in response to the video carrier component having a frequency $f_p$ and the sound carrier component having a frequency $f_S$, a buzz and a buzz beat are produced by the amplitude component of the video carrier signal having the frequency $f_p$. As a result, in response to a sound-multiplexed broadcast, the intercarrier sound detecting circuit of FIG. 1 produces a buzz and a buzz beat in a sound sub-channel.

Figure 2:
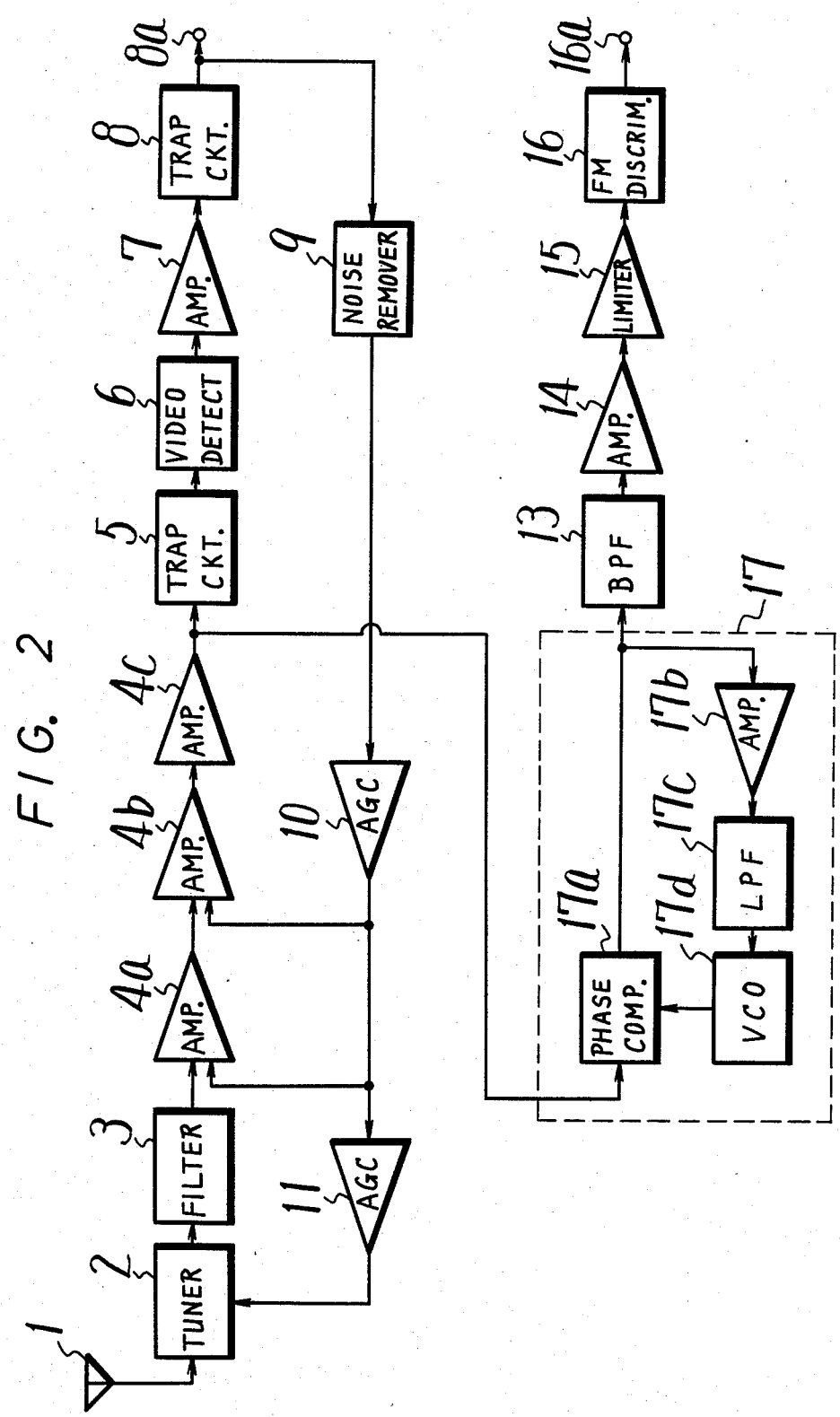
FIG. 2 is a block diagram of a sound detecting circuit according to one embodiment of the present invention for use with a television receiver.

Referring now to FIG. 2, an intercarrier sound detecting circuit according to one embodiment of this invention and which substantially eliminates the problems of the prior art circuit of FIG. 1 is shown, in which elements corresponding to those described above with respect to the circuit of FIG. 1 are identified by the same reference numerals, and a detailed description thereof will be omitted herein for the sake of brevity. In particular, the video portion of the circuit of FIG. 2 is identical with that of FIG. 1 and will be omitted from the description herein. In regard to the sound detecting portion of the circuit of FIG. 2, the VIF signal from third VIF amplifier 4c is supplied to a phase-locked loop (PLL) circuit 17 which phase-locks the VIF signal from third VIF amplifier 4c with respect to the amplitude-modulated video carrier component thereof which has a frequency $f_p$. In particular, the VIF signal from third VIF amplifier 4c is supplied to one input of a phase comparator 17a of PLL circuit 17. The output signal from phase comparator 17a constitutes the output signal of PLL circuit 17 and is also supplied through a DC amplifier 17b to a low pass filter (LPF) 17c having a cut-off frequency lower than 31.5 KHz, for example, equal to 1 KHz. The output signal from LPF 17c is supplied to a voltage-controlled oscillator (VCO) 17d to control the oscillation frequency thereof. As a result, an oscillation signal from VCO 17d and having a frequency of 58.75 MHz equal to the frequency of the video carrier component of the VIF signal, is supplied to the other input terminal of phase comparator 17a. It is to be appreciated that, by use of low pass filter 17c, undesirable frequency drift is rejected so that the frequency of the oscillation signal is precisely coincident with the frequency of the video carrier component. In this manner, the output signal from PLL circuit 17 and, more particularly, from phase comparator 17a thereof, is phase-locked with respect to the video carrier component of the VIF signal. In particular, since the amplitude of the video carrier component is much larger than the amplitude of the sound carrier component, the output signal from PLL circuit 17 will therefore be locked with respect to the frequency of the video carrier component. Thus, when PLL circuit 17 is operating in a locked state, it forms a phase detecting circuit which produces a phase-locked output signal including the aforementioned 4.5 MHz beat of difference signal. The output signal from phase comparator 17a of PLL circuit 17 is supplied to BPF 13 which, as aforementioned, extracts the 4.5 MHz beat signal therefrom and supplies the same to sound IF amplifier 14. The output signal from sound IF amplifier 14, as previously discussed, is supplied through amplitude limiter 15 and frequency discriminator 16 to sound output terminal 16a, in the same manner as performed by the circuit of FIG. 1.

Thus, with the intercarrier sound detecting circuit according to the present invention, the television broadcast signal is supplied from antenna 1 through tuner 2 and VIF signal extracting filter 3 to VIF amplifiers 4a, 4b and 4c in which the sound carrier component having a frequency $f_S$ and the video carrier component having a frequency $f_p$ are both amplified. Thereafter, the VIF signal is supplied sequentially through trap circuit 5, video detector 6, video amplifier 7 and trap circuit 8 to video output terminal 8a at which the resulting video signal is supplied. In regard to the sound signal, the VIF signal from third VIF amplifier 4c is supplied to PLL circuit 17 where it is phase-locked with respect to the amplitude-modulated video carrier component of the VIF signal. The output signal from phase comparator 17a of PLL circuit 17 is supplied to BPF 13 which transmits therethrough only the 4.5 MHz beat signal in sequence to sound IF amplifier 14, amplitude limiter 15 and frequency discriminator 16 which, in turn, produces the sound signal at sound output terminal 16a.

It is to be appreciated that, with the present invention, PLL circuit 17 phase-locks the VIF signal from third VIF amplifier 4c with respect to the amplitude-modulated video carrier component of the VIF signal. In such case, PLL circuit 17 forms the required phase detector circuit. The output signal from PLL circuit 17 thereby contains no amplitude components but rather, only phase components so that no buzz, buzz beat or the like are produced by the amplitude component of the video carrier component of the VIF signal, as with the prior art circuit of FIG. 1. Further, since the cut-off frequency of LPF 17c is selected lower than 31.5 KHz, which is equal to two times the horizontal frequency $f_H$, that is, $2f_H$, PLL 17 is insensitive to frequencies higher than 31.5 KHz. As a result, mixing components with frequencies higher than $2f_H$, for example, mixing of the video signal with the detected output signal having a frequency of 4.5 MHz can be avoided so as to further reduce or eliminate buzz and buzz beat in the sound sub-channel of a sound-multiplexed broadcast.

Having described a specific preferred embodiment of the invention with reference to the accompanying drawings, it is to be understood that the invention is not limited to that precise embodiment, and that various changes and modifications may be effected therein by one of ordinary skill in the art without departing from the scope or spirit of the invention thereof as defined in the appended claims.

What is claimed is:

1. Sound detecting apparatus for a television receiver comprising:

receiving means for receiving a television signal including an amplitude-modulated video carrier component and a sound carrier component;

video intermediate frequency means for producing a video intermediate frequency signal having said amplitude-modulated video carrier component and said sound carrier component, in response to said received television signal;

phase-locked loop means for phase-locking said video intermediate frequency signal with respect to said amplitude-modulated video carrier component thereof and producing an output signal in response thereto; and sound signal generating means for producing a sound signal in response to said output signal.

2. Sound detecting apparatus according to claim 1; in which said phase-locked loop means includes phase comparator means for producing said output signal in response to said video intermediate frequency signal and a voltage controlled oscillation signal, control means for producing a control signal in response to said output signal, and voltage controlled oscillator means for producing said voltage controlled oscillation signal in response to said control signal.

3. Sound detecting apparatus according to claim 2; in which said control means includes low pass filter means for producing said control signal.

4. Sound detecting apparatus according to claim 3; in which said low pass filter means includes a low pass filter having a cut-off frequency lower than 31.5 KHz.

5. Sound detecting apparatus according to claim 2; in which said control means includes DC amplifier means supplied with said output signal to produce a DC amplified signal and low pass filter means for producing said control signal in response to said DC amplified signal.

6. Sound detecting apparatus according to claim 1; in which said output signal from said phase-locked loop means includes a 4.5 MHz beat signal component; and said sound signal generating means includes band pass filter means for transmitting substantially only the 4.5 MHz beat signal component, and frequency discriminator means for producing said sound signal in response to said 4.5 MHz beat signal component transmitted through said band pass filter means.

7. Sound detecting apparatus according to claim 6; which said sound signal generating means further includes amplifier means for amplifying said 4.5 MHz beat signal component transmitted through said band pass filter means, limiter means for amplitude limiting said 4.5 MHz beat signal component amplified by said amplifier means to produce a 4.5 MHz amplitude limited signal, and said frequency discriminator means frequency discriminates said 4.5 MHz amplitude limited signal to produce said sound signal.

8. Sound detecting apparatus according to claim 1; in which said receiving means and said video intermediate frequency means include antenna means for receiving said television signal, tuner means for selecting a desired frequency range of said received television signal from said antenna means and producing a tuned signal having said video intermediate frequency components in response thereto, filter means for extracting said video intermediate frequency components from said tuned signal, and video intermediate frequency amplifier means for producing said video intermediate frequency signal in response to said extracted video intermediate frequency components.

* * * * *